Oct. 14, 1947.     D. C. HULL     2,428,846
CONTINUOUS PROCESS OF PRODUCING ALDOL
Filed Dec. 27, 1945     3 Sheets-Sheet 1

DAVID C. HULL
INVENTOR

Oct. 14, 1947.  D. C. HULL  2,428,846
CONTINUOUS PROCESS OF PRODUCING ALDOL
Filed Dec. 27, 1945  3 Sheets-Sheet 2

DAVID C. HULL
INVENTOR

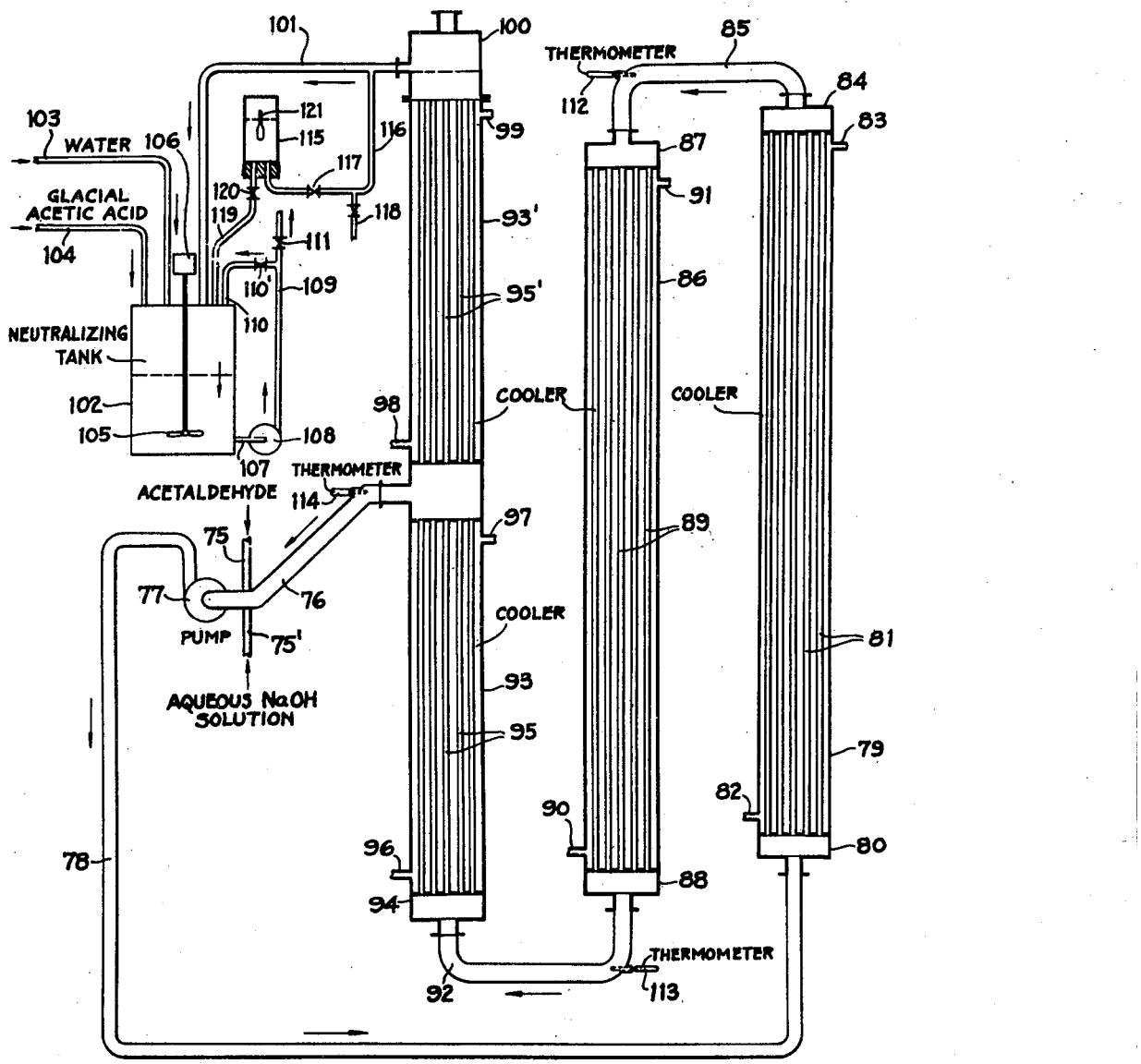

UNITED STATES PATENT OFFICE 2,428,846

CONTINUOUS PROCESS OF PRODUCING ALDOL

David C. Hull, Oak Ridge, Tenn., assignor of one-half to Air Reduction Company, Incorporated, New York, N. Y., a corporation of New York Application December 27, 1945, Serial No. 637,382

17 Claims. (Cl. 260—602)

This invention relates to the production of aldol and more particularly to a continuous cyclic process wherein aldol may be produced in satisfactory commercial yields and with a minimum of loss by conversion to polymerized or resinified products.

This application is related to my copending application Serial No. 550,244, filed August 19, 1944.

As is well known, aldol can be prepared by the condensation of two molecules of acetaldehyde in the presence of an alkaline catalyst such as sodium hydroxide. The reaction is as follows:

(acetaldehyde)        (aldol)

Since the reaction is exothermic a number of problems arise in connection with the production of aldol on a commercial scale and in satisfactory yields. For example, if the temperature is permitted to rise and the heat given off is not removed, the reaction tends to accelerate and this in turn results in the evolution of still more heat. Under certain circumstances, if provision is not made for removing the heat thus liberated, the reaction can proceed to the point where it takes place with explosive violence. Furthermore, over-heating of the reaction mixture tends to cause polymerization of the aldol itself with formation of undesired insoluble higher polymers or resinified products which contaminate the reaction mixture and tend to clog the conduits leading from the reaction vessel as well as other parts of the apparatus, thus cutting down the desired yield of aldol and reducing the general efficiency of the process.

Many attempts have been made to eliminate or minimize these undesirable concomitants of the aldol process. For example, it has been proposed to operate the process batchwise in order to keep down the volume of the reacting mass and more readily to control the temperature. This method is, of course, uneconomical and has not resulted in elimination of the above-mentioned drawbacks. It has also been proposed to dilute the acetaldehyde or the reaction mixture with water, the theory being that the added water would tend to absorb the heat given off in the reaction and thus keep the temperature of the reaction mixture as a whole within controllable limits. This has the serious disadvantage that the aldol thus obtained contains a large amount of water which must eventually be removed by distillation or other equally expensive procedures. Another suggestion has been to employ in the reaction mixture certain highly hydrated salts which give up their water of hydration, thus providing a medium for absorption of the heat of reaction. Numerous other expedients have been suggested, but all of them have defects or disadvantages which render their use impractical in obtaining satisfactory commercial yields of aldol.

This invention has as an object to provide an efficient and economical continuous process of producing aldol. A further object is to provide a continuous process for producing aldol in which the temperature of the reacting mixture may be controlled within desired limits. A still further object is to provide a continuous process for the production in commercial quantities of aldol in which loss of product by polymerization or resinification is minimized or effectively prevented and in which aldol substantially uncontaminated with polymers or aldehyde resins is obtained. Another object is to provide a continuous process for the production of aldol which affords a ready means of continuously adding aldehyde and catalyst to the reaction mixture and of continuously withdrawing the product formed. A specific object of the invention is to provide a process in which intimate contact and thorough mixing of the various ingredients of the reaction mixture is obtained and wherein localized concentrations of aldol in contact with alkaline catalyst is precluded. Other objects will appear hereinafter.

These objects are accomplished by the following invention which, in its broader aspects, is based upon the discovery that condensation of acetaldehyde to aldol can be controlled and that aldol can be produced continuously and in satisfactory commercial yields by cycling a solution of acetaldehyde in aldol through a temperature-controlled reaction chamber and continuously adding acetaldehyde and alkaline catalyst to the cycled solution. I have found that dilution of the acetaldehyde with aldol affords a means, not only of controlling the temperature of the reaction and keeping it within desired limits, but also of preventing localized concentrations of alkaline catalyst in contact with aldol or acetaldehyde, thus avoiding formation of polymerized or resinified products.

In carrying out the process of my invention, acetaldehyde and a suitable alkaline catalyst, such as sodium hydroxide, is continuously introduced into and recycled through a reaction vessel provided with temperature controlling means. As the reactants are added, an equivalent volume of solution containing a substantial proportion of aldol, but also containing some unreacted aldehyde, water, and catalyst, is continuously withdrawn from the cycle. To this withdrawn portion of reaction mixture an acid, such as acetic acid, is added in an amount sufficient to neutralize the catalyst. The aldol, substantially free from polymerized or resinified bodies, may then be recovered from the solution or mixture by known procedures or may be converted into other desired products, such as crotonaldehyde.

While in general the condensation reaction may be completed and a substantially polymer- and resin-free aldol produced while the solution or reaction mixture is being recycled, in accordance with my invention, if the reaction has not progressed to the desired degree in the cycling solution, the reaction may be continued, under temperature-controlled conditions, in that portion of the solution which is continuously withdrawn from the recycling liquid and before neutralization. The extent to which it may be desired to continue the reaction in this withdrawn portion will of course depend on how far the reaction has progressed in the recycling liquid, as well as the yield desired and this will in turn depend upon various factors, such as the rate of feed of acetaldehyde and catalyst, temperature of the recycling liquid and other variables.

The temperature of the condensation reaction should be controlled within certain limits within the range of 0°–40° C. In general, aldol of satisfactory quality may be produced at acceptable rates at temperatures of 5–15° C., although various other ranges above or below this range may be employed, such as 0°–5° C., 10°–20° C. and 20°–40° C. with appropriate adjustment of feed rates of aldehyde and caustic, of pressures and other conditions. As indicated above, control of the temperature of the reaction in accordance with my invention is effected by causing the reaction to occur in a body of a solution of acetaldehyde and catalyst in aldol and by cooling the solution in which the reaction is taking place by passing the solution into contact with any convenient cooling means such as a jacketed vessel, cooling coils or other appropriate means. The cooling medium may be water, brine, ammonia, glycol, or other suitable heat exchange fluid.

The condensation catalyst may be any of the alkaline catalysts usually employed for the condensation of acetaldehyde to aldol such as hydroxides or carbonates of the alkali metals or oxides of the alkaline earth metals. As a rule, I prefer to use sodium hydroxide as the catalyst. The amount of catalyst employed may be varied within rather wide limits, depending upon whether or not an acid-free acetaldehyde is employed, the amount the acetaldehyde may be diluted by water and various other factors. In general, I find it expedient to add the catalyst to the reaction mixture in the form of an aqueous solution of the desired concentration, preferably of the order of 5–10%. Sufficient caustic solution is continuously fed to the cycling solution preferably to give the reaction mixture a pH within the range of 9–11.

As will be apparent from the detailed examples set forth hereinafter, the conditions of operation of the process may vary rather widely within the scope of my invention. For example, the rate of production of aldol may be increased by increasing the rate of feed of acetaldehyde and catalyst. If this results in a rise in the reaction temperature, the increase in heat output may be compensated for by an increase in the rate of recycling or by lowering the temperature of the cooling medium or by both increasing the recycling rate and lowering the temperature.

In the following examples and description, I have set forth several of the preferred embodiments of my invention but they are included merely for purposes of illustration and not as a limitation thereof.

In the accompanying drawings,

Fig. 3 is a still further diagrammatic illustration of an apparatus in which aldol may be produced on a commercial scale.

My invention will be more fully understood by reference to the following examples of my process as practiced, respectively, on a laboratory, a pilot plant and a commercial scale.

Figure 1:
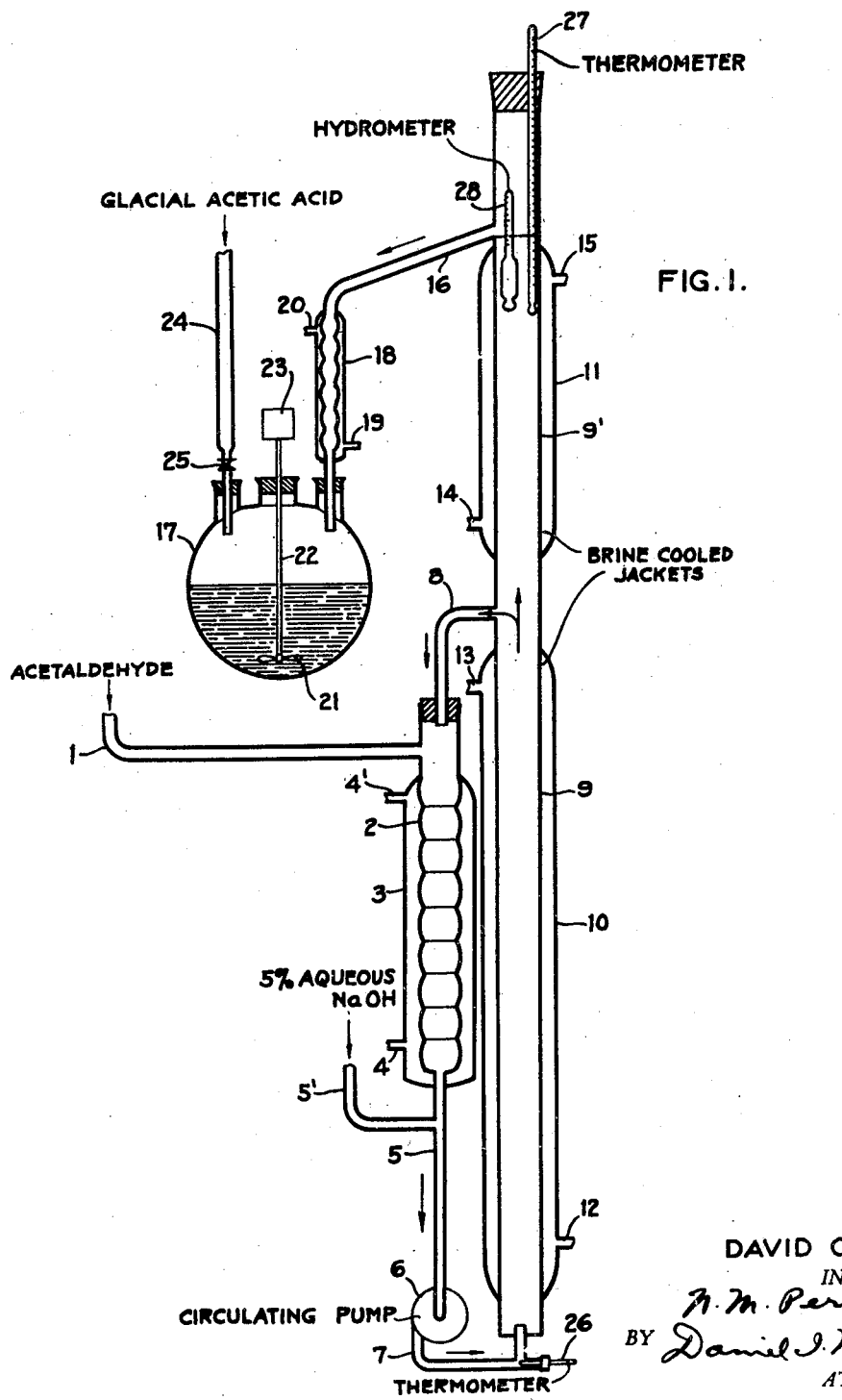
Fig. 1 is a diagrammatic illustration of one form of apparatus in which aldol condensations may be carried out in accordance with my invention.

*Example 1.*—Referring to Fig. 1, in which the apparatus is constructed almost entirely of glass, the numeral 1 designates a tube for supplying acetaldehyde continuously and at a controlled rate through a rotameter or burette (not shown) to a jacketed column 2, through the jacket 3 of which a cooling medium such as brine is passed, the latter entering through inlet 4 and leaving through inlet 4'.

Column 2 is connected, as shown, by means of arm or tube 5, to rotary circulating pump 6 and its outlet conduit 7, and return tube 8, to a jacketed reactor 9, jackets 10 and 11 of which are supplied with cold brine through inlet and outlet conduits 12 and 13, and 14 and 15, respectively. Reactor 9, which is divided into two segments or reactors 9 and 9' at approximately the level of return tube 8, is provided in proximity to the upper end of 9' with tubular side-arm 16 which serves as an outlet or overflow conduit for conducting the aldol-containing reaction mixture or solution from reactor 9' to a neutralization vessel 17. As shown, side arm 16 is provided with a cooling jacket 18 supplied through inlet 19 and outlet 20 with cooling medium.

Vessel 17 is equipped with a rotating or propeller type agitator 21 attached to shaft 22 driven by motor 23. To this vessel is attached a tube 24, provided with valve 25 for admitting a supply of acetic acid to neutralize the caustic content of the aldol solution entering the vessel through 16.

The number 5' designates a conduit through which sodium hydroxide or other aldol condensation catalyst may be introduced in metered amounts, as by a burette or rotameter (not shown) into the fluid flowing in conduit 5.

Thermometers 26 and 27 are provided to indicate, respectively, the temperature of the mixture of acetaldehyde and catalyst (after start of the process, the solution of aldol, acetaldehyde, catalyst and water) entering the bottom of reactor 9, and the temperature of the solution overflowing at the top of reactor 9'. A hydrometer 28 is also provided for determining the specific gravity of the solution leaving through 16.

The process of condensing acetaldehyde to aldol in accordance with my invention is carried out in this apparatus as follows:

Acetaldehyde, preferably acid-free, is supplied through a burette at the rate of about 60 c.c. per minute to column 2 through tube 1, the acetaldehyde thus being cooled to the desired temperature, in the vicinity of 10° C., through the agency of cooling medium circulating through jacket 3. Pump 6 is started and the cooled acetaldehyde passes to the suction side of pump 6 through tube 5. On its way to the pump, it meets and is mixed with a five per cent aqueous solution of sodium hydroxide, introduced through tube 5' at the rate of 1.2 to 1.7 c.c. per minute, giving the reaction mixture or solution a pH value within the range of 9 to 11.

The acetaldehyde and sodium hydroxide are thoroughly mixed together as they pass through the circulating pump and proceed through conduit 7 into the bottom of reactor 9. The condensation reaction begins to take place immediately upon contact of the caustic with the acetaldehyde, and since the reaction is exothermic, a considerable amount of heat is given off as the reaction mixture or solution passes upwardly through reactor 9. Aldol is continuously formed as the liquid progresses through reactor 9 and the heat of reaction is absorbed by circulation of cold brine through jacket 10 of the reactor.

The temperature of the brine circulating in jackets 10 and 11 is so regulated as to maintain the reaction mixture or solution at such a temperature that it will have at thermometer 26 a temperature of anywhere from about 4° C. to a temperature of about 16° C., and at thermometer 27, temperature substantially the same, although the latter may rise somewhat higher under some circumstances.

As indicated in Figure 1, the reactor 9 is divided into two segments or reactors at approximately the level of return conduit 8. As the reaction mixture builds up in reactor 9, it fills it to approximately the level of conduit 16, as shown. In accordance with my invention, the reaction mixture or solution is thus divided into two parts at the level of pipe 8, as shown by the arrows. One part is drawn by the suction brought about by pump 6 down through pipe 8 into column 2, thence through pipe 5 where it is admixed with further additions of caustic solution introduced through conduit 5'; thence through circulating pump 6, conduit 7, and again introduced into the bottom of reactor 9. The other part overflows into the upper segment or reactor 9' and eventually finds its way through overflow conduit 16 into neutralizing vessel 17. The liquid progressing through the upper segment of reactor 9' is, as previously indicated, cooled by the cooling medium circulating through jacket 11.

In vessel 17 the aldol solution containing unreacted acetaldehyde, water and the dissolved caustic, is thoroughly mixed with glacial acetic acid introduced in metered amounts through valved conduit 24, mixing being facilitated by operation of agitator 21 rotated through the agency of motor 23. The sodium hydroxide catalyst is thus neutralized, being converted to sodium acetate which remains in solution.

The reaction mixture, after neutralization of the catalyst, was found to have a specific gravity of .9536 at 20° C. and a refractive index at 20° C. of 1.3880. The product consisted of approximately 50–60% aldol, the balance being a mixture or solution of unreacted acetaldehyde, water and sodium acetate.

The liquid in vessel 17 may be treated in any desired manner for recovery of the aldol in substantially polymer- and resin-free condition, or the aldol content may be converted directly by distillation into crotonaldehyde, or other products, any unreacted aldehyde recovered being returned to the aldolization step or otherwise treated.

It will thus be seen that my process is characterized by the fact that the condensation reaction whereby acetaldehyde is condensed to aldol occurs chiefly in a reaction mixture, which is a solution containing a substantial amount of aldol together with unreacted acetaldehyde and catalyst, which is constantly being divided, one part being recycled through a circuit constituted by reactor 9, pipe 8, column 2, pipe 5, pump 6 and conduit 7, the other part going through reactor 9' to neutralization in 17. Thus, I maintain a body of a solution of acetaldehyde and alkaline catalyst in aldol, continuously withdraw a portion of the solution from the body of the circulating solution adjacent the upper part thereof in reactor 9 and send it to neutralization in vessel 17, continuously add acetaldehyde and alkaline catalyst to another part of the withdrawn portion of the solution returned through pipe 8 and return this part of the solution to the body of solution adjacent the other end of reactor 9.

As indicated above, if the condensation reaction has not progressed to the desired extent while the solution is being recycled through reactor 9, further reaction is permitted to take place in the second reactor (upper segment or reactor 9'), the temperature control on this second reactor being similar to that on reactor 9. In either mode of operation, the aldol solution is always eventually treated with acid to neutralize the catalyst.

Figure 2:
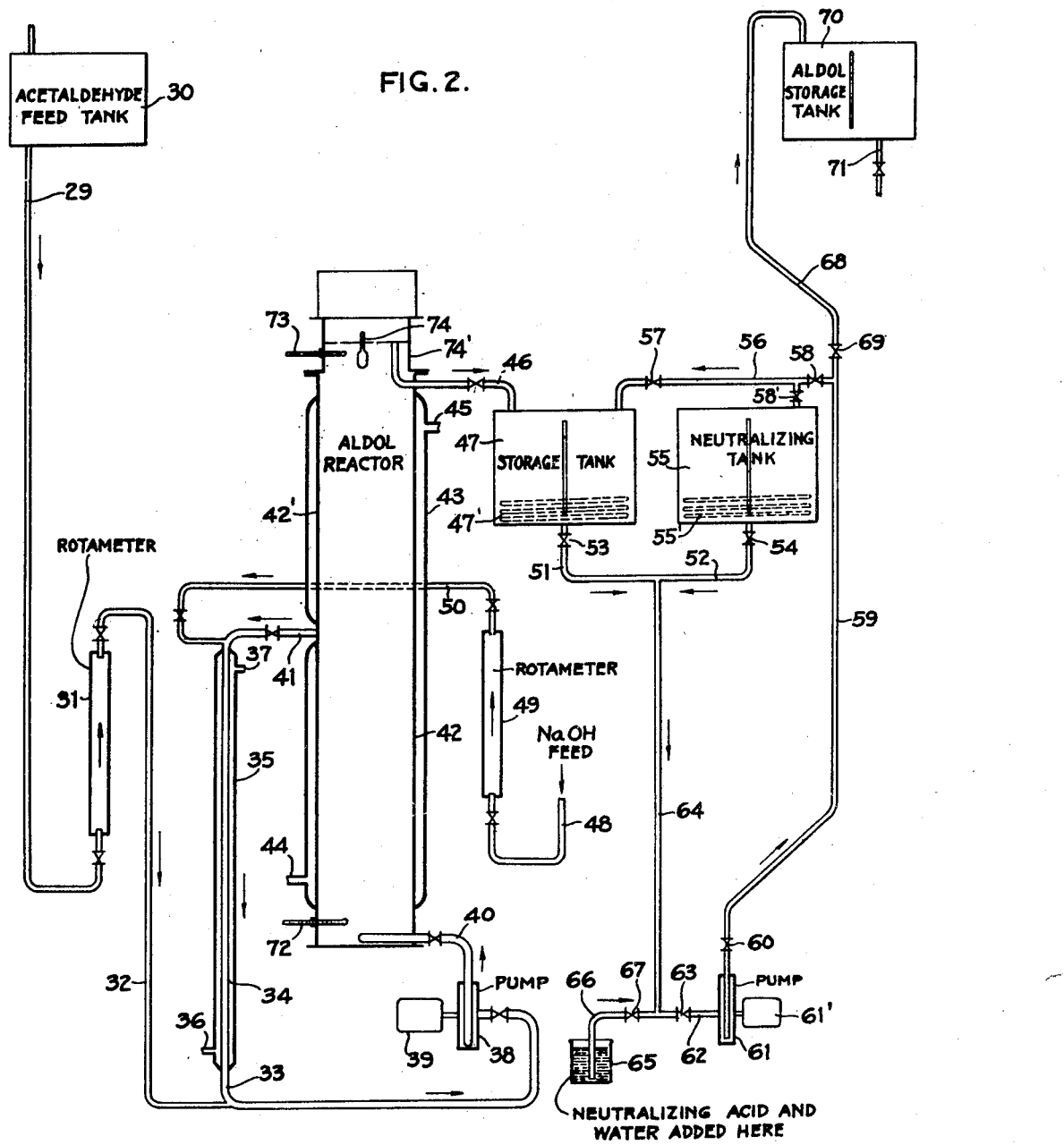
Fig. 2 is a diagrammatic illustration, in the nature of a flow sheet, of another form of apparatus in which my process may be carried out on a substantially larger scale than in the apparatus of Fig. 1.

*Example 2.*—Referring to Figure 2, which is a diagrammatic representation of an apparatus suitable for carrying out my process on a pilot plant scale in which 300 to 500 pounds per day of aldol may be produced in accordance with my invention, numeral 29 designates a conduit for supplying acetaldehyde from supply tank 30 to a rotameter 31 which meters the aldehyde through conduit 32 into a circulating stream of reaction fluid emerging through outlet conduit 33 from pipe 34 which itself is provided with jacket 35 through which a cooling medium passes, entering through inlet 36 and leaving through outlet 37.

Pipe 34 is connected, as shown, through outlet conduit 33, rotary circulating pump 38 (driven by motor 39), conduit 40, and valved return conduit 41 to a jacketed reactor 42, jacket 43 of which is supplied with cold glycol through inlet 44 and outlet 45. Reactor 42 is divided at approximately the level of return conduit 41 into two segments or reactors, 42 and 42'. The reactor is also provided, in proximity to the upper end of segment or reactor 42', with a tubular side arm or valved conduit 46 which serves as an outlet or overflow for conducting the aldol-containing reaction mixture or solution from the top of reactor 42' to a storage tank 47 provided with cooling coils 47' through which cold glycol circulates.

Numeral 48 designates a valved conduit through which an aqueous 2N sodium hydroxide solution is fed from a suitable source (not shown) to rotameter 49 which feeds the solution in metered amounts through valved conduit 50 into return conduit 41 at a point in proximity to the junction of 41 with pipe 34.

Storage tank 47 is connected by means of conduits 51 and 52 equipped, respectively, with valves 53 and 54, to neutralizing tank 55. Tank 55, likewise provided with cooling coils 55', is also connected through a valved conduit to conduit 56 provided with valve 57. An extension of conduit 56, provided with valve 58, connects conduit 56 through circulating conduit 59, provided with valve 60, to a circulating pump 61 actuated by motor 61'. Conduit 56 is connected to tank 55 by means of conduit 56', provided with valve 58'. Pump 61 is connected through conduit 62, provided with valve 63, and conduit 64 to conduits 51 and 52, as shown. Numeral 65 designates a vessel containing acetic acid and water which is connected to circulating pump 61 and its attachments by conduit 66, the latter being provided with valve 67, connection being at the junction of conduit 62 with conduit 64.

Numeral 68 designates a conduit, provided with valve 69, for conducting neutralized aldol solution to an appropriate storage tank 70, from which it may be withdrawn through valved conduit 71 for such use as may be desired, as, for example, conversion to other products such as crotonaldehyde.

Thermometers 72 and 73 are provided to indicate, respectively, the temperature of the mixture of aldol, acetaldehyde, and catalyst entering the bottom of the reactor 42 and the temperature of the solution overflowing at the top of reactor 42'. A hydrometer 74 is also provided for indicating the specific gravity of the aldol solution at this point.

The hydrometer 74 is visible for the reason that it and the thermometer 73 are contained in the glass section 74' which acts as a sight glass. The remainder of the equipment is constructed of suitable resistant metal such as iron, steel, stainless steel, copper or brass, as is well known by those skilled in the art of dealing with acetaldehyde, acetic acid, sodium hydroxide solutions, aldol, etc.

Aldol may be produced in the apparatus just described in amounts of approximately 300–500 pounds per day by operating as follows:

Acetaldehyde is fed from tank 30 through rotameter 31 at the rate of 0.653 pound per minute into jacketed pipe 34 which is cooled by circulation of cold glycol through jacket 35. Pump 38 is started and the fluid level begins to rise in reactor 42. When it reaches the level of conduit 41, it overflows therethrough and fills jacketed pipe 34. On its way into pipe 34 the liquid meets and is mixed with a 2N aqueous sodium hydroxide solution introduced through conduit 48, rotameter 49, and conduit 50 at a rate of about 45 ml. per minute.

Thorough mixing of the acetaldehyde and sodium hydroxide occurs as the mixture passes through the circulating pump 38 and is forced through conduit 40 into the bottom of the reactor 42. The condensation reaction begins to take place immediately upon contact of caustic with the acetaldehyde with evolution of heat, but the heat is absorbed through the agency of the cold glycol flowing through jacket 43. The cooling medium may have a temperature of −10° to 0° C. to give the liquid within the reactor a temperature, for example, of 10–15° C.

As the body of solution builds up in the system it eventually reaches the top of reactor 42', overflowing through conduit 46, and passing into storage tank 47. At the overflow the solution is found to have a pH value of 9.7 and a specific gravity of 1.06.

As previously indicated, the solution, as it reaches the top of reactor 42', is a mixture containing substantial amounts of aldol but also containing some unreacted acetaldehyde, water, and the dissolved caustic. This mixture overflows from the top of the reactor through conduit 46 into cooled storage tank 47. When the tank is filled, valve 57 is closed, valves 53, 63, 60, 58, and 58' are opened, pump 61 started, and the solution pumped from tank 47 into cooled neutralizing tank 55. When tank 55 is partially full, valve 53 is closed, valve 67 is opened, admitting an amount of water, corresponding to 10–30 per cent of the volume of the reaction mixture, and containing slightly more than the theoretical amount of glacial acetic acid required to neutralize the sodium hydroxide in the reaction mixture. After this amount of acidified water is pumped into tank 55, valve 67 is closed. Valve 54 is then opened and the entire contents of tank 55 are recirculated by means of pump 61 until thoroughly mixed and neutralization of the caustic is completed. Valve 58 is closed, valve 69 opened and the neutralized mixture pumped to storage tank 70. A sight glass is provided for each of the tanks 47, 55 and 70 to aid in determining the level of liquid in each tank.

As in Example 1, it will be seen that condensation of acetaldehyde to aldol is carried out in a recycling reaction mixture or solution composed of aldol, acetaldehyde, and catalyst, circulating through reactor 42, conduit 41, pipe 34, conduit 33, pump 38, and conduit 40, to which circulating solution there are constantly added accretions of acetaldehyde and sodium hydroxide through conduits 32 and 50 respectively. As in Example 1, the reaction mixture or solution is divided into two parts, one part being recycled and the other part progressing through reactor 42' to eventual neutralization in tank 55. Here, as in Example 1, the process may be operated under such conditions that the desired degree of aldolization is obtained in the recycling mixture, but if this is not attained while the liquid is being recycled, further reaction can take place in temperature-controlled reactor or segment 42'. Thus, the conditions of operation of this pilot plant setup are to all intents and purposes identical with the conditions of operation of the smaller scale operation illustrated in Example 1.

In a typical run in which 268 pounds of aldol were produced from a total of 299 pounds of acetaldehyde fed to the process, thus giving a yield of approximately 90%, the specific gravity of the neutralized mixture averaged about 1.06, showing that the solution contained approximately 88% aldol.

*Example 3.*—Referring to Fig. 3, which is a diagrammatic representation of an apparatus suitable for carrying out my process on a commercial scale in which 10,000 to 50,000 lbs. per day of aldol may be produced, the numeral 75 designates a conduit through which acetaldehyde may be continuously introduced in metered amounts (by means of a rotameter, not shown) into conduit 76 through which it is conveyed to the suction side of a high-speed rotary pump 77. Numeral 75' designates a conduit through which a 5% aqueous sodium hydroxide solution may likewise be continuously introduced in metered amounts into and mixed with the stream of liquid passing through conduit 76 to pump 77. The apparatus of Fig. 3 is made of resistant metal such as iron, steel, stainless steel, copper or brass, as is well known to those skilled in the art of handling acetic acid, aldehyde, NaOH solutions, aldol, etc.

Pump 77 delivers the mixture of acetaldehyde and catalyst (after start of process, the solution of acetaldehyde and catalyst in aldol) through conduit 78 to a reactor 79 which comprises a cylindrical steel shell provided with a header 80 which feeds the solution to a plurality of tubes 81 around which circulates a cooling fluid such as glycol or liquid ammonia introduced through inlet 82 and emerging through outlet 83.

The solution passes from reactor 79 through header 84 and conduit 85, thence into a second reactor 86, which is practically identical with reactor 79, being similarly provided with headers 87 and 88, tubes 89, and inlet 90 and outlet 91 for ingress and egress of cooling fluid. This reactor 89 is likewise connected through conduit 92 with reactor 93, provided at its bottom with header 94.

Reactor 93, which is connected to pump 77 through conduit 76, is of somewhat different construction in that it is itself divided into two segments or reactors 93 and 93' at approximately the level of the junction of conduit 76 with the top of reactor 93. This conduit functions as a return line for completing the circuit of fluid through the several reactors and the pump 77. Each of the two segments or reactors 93 and 93' comprise, respectively, a group of tubes 95 and 95' around which flows a cooling fluid introduced, in the case of reactor 93, through inlet 96, and leaving through outlet 97, and in the case of reactor 93' being introduced through inlet 98 and leaving through outlet 99.

Reactor 93' is connected, through header 100 and conduit 101, with neutralizing tank 102 into which water and glacial acetic acid may be introduced in metered amounts through conduits 103 and 104, respectively. Tank 102 is equipped with a rotary propeller-type agitator 105 actuated by motor 106 and is also provided with means to recirculate the solution undergoing neutralization, said means comprising outlet conduit 107, pump 108, conduit 109, and return conduit 110 provided with valve 110'. Conduit 109 is provided with valve 111 in order to provide that solution may either be recirculated through the tank or bled off therefrom and conveyed to storage or led to any other desired operation. Thermometers 112, 113, and 114 are also provided to indicate the temperature of the solution at the indicated locations.

In order to provide means for checking specific gravity of the reaction mixture as it emerges from the top of reactor 93' there is provided a hydrometer sight box 115 which may take the form of a cylindrical glass tube, open at its upper end and stoppered at its lower end. Connection is made between conduit 101 and sight box 115 through a tube 116 provided with valve 117 and, if desired, also provided with valved sampling pipe 118. A drain tube 119 equipped with valve 120 provides a means of draining liquid from 115 into neutralizing tank 102.

To make a hydrometer reading on the reaction mixture valve 120 is closed, valve 117 is opened and vessel 115 is permitted to fill up until it floats the hydrometer 121, after which valve 117 is closed. A reading is then made. Valve 120 may then be opened and the test sample permitted to flow into tank 102.

Aldol may be produced in the apparatus just described in commercial quantities ranging from 10,000 to 50,000 pounds per day or more by operating as follows:

Acetaldehyde is metered through conduit 75 into conduit 76 by means of a rotameter at the rate, say, of 12 gallons per minute. At the same time a 4-5 per cent aqueous sodium hydroxide solution is metered at the rate of one half gallon per minute through conduit 75' into and is mixed with the acetaldehyde introduced into conduit 76, through conduit 75. Pump 77 is started and circulates the mixed aldehyde and catalyst at the rate of 600 gallons per minute. The mixture thus proceeds through conduit 78 into reactor 79 where, in passing through tubes 81, it is cooled by means of glycol flowing within the shell of reactor 79, the temperature of the glycol being such as to maintain the reaction mixture at a temperature preferably of the order of about 10° C.

As explained in Examples 1 and 2, inasmuch as the condensation reaction begins to take place immediately upon contact of the caustic with the acetaldehyde, the reaction mixture progressing through conduit 78, reactor 79 and the successive reactor units 86, 93 and 93' is composed of a solution of acetaldehyde and caustic in aldol, and also contains some water introduced via the caustic solution.

Upon leaving reactor 79, the solution passes to reactor 86 through conduit 85 where, in passing through the tubes 89 of this reactor, the temperature is maintained at approximately the same value as in reactor 79. Upon emerging from the bottom of reactor 86 through header 88, the mixture passes through conduit 92 through header 94 into reactor 93 where, in passing through the tubes 95 of this reactor, the temperature of the solution is maintained substantially the same as in the previous two reactors.

The solution continues to rise in reactor 93 and finally fills reactor 93', from which it overflows through conduit 101 into neutralizing tank 102. Inasmuch as pump 77 is continuously operating, the solution is divided into two parts at approximately the level of that portion of conduit 76 which joins the top of reactor 93, one part going to the suction side of pump 77 to be recycled through conduit 78, reactors 79, 86, and 93, the other part passing through reactor 93' to eventually find its way to neutralization tank 102. The caustic content of the solution is neutralized in 102 by glacial acid added through 104 in an amount to make the solution about .2 per cent acid as acetic acid. In addition to glacial acetic acid, it is found advantageous also to introduce water into the liquid undergoing neutralization in order to keep sodium salts in solution. Neutralization is facilitated, of course, by operating agitator 105 through the agency of motor 106. It is also found to be advantageous to periodically open valve 110', close valve 111 and operate rotary pump 107 so as to recirculate the neutralization mixture through tank 102, conduit 107, pump 108, and conduits 109 and 110 until neutralization is complete.

The dimensions of the apparatus may be such as to give, at the indicated rate of flow of the reaction mixture, a holdup time in the reactor of approximately 18 minutes, although this may be varied rather widely, as desired. After the mixture passes through reactor 93, it is drawn out through conduit 76 to the suction side of pump 77 at the rate of 600 gallons per minute. An amount of reaction fluid equivalent to the feed, which would be approximately 12½ gallons per minute, passes up through reactor 93' and thence to the neutralizing tank.

The liquid contents of tank 102, after neutralization, is composed of aldol, unreacted acetaldehyde, water, and dissolved salts. This liquid may be treated in any desired manner for recovery of the aldol in substantially polymer- and resin-free condition, or the aldol content may be converted directly by distillation into crotonaldehyde or other products, any unreacted aldehyde recovered being returned to the aldolization step or otherwise disposed of.

It will of course be understood that the temperature of the solution as it progresses through the various reactors is read from thermometers 112, 113, and 114, as shown.

As in Examples 1 and 2, it will be seen that condensation of acetaldehyde to aldol is carried out in accordance with my invention in a recycling mixture or solution composed of aldol, acetaldehyde, and catalyst to which there are constantly added accretions of acetaldehyde and sodium hydroxide. It will also be apparent that the conditions of operation of this full commercial scale setup are substantially identical with the conditions of operation of the smaller scale units illustrated in Examples 1 and 2, with the exception that additional cooling surface and reactor space are provided for handling the proportionately larger amounts of reaction mixture.

In typical operation the specific gravity of the reaction mixture will average 1.06 showing a high percentage aldol.

It will thus be seen that I have provided a new improved and highly efficient method of obtaining aldol-acetaldehyde mixtures containing high percentages of aldol and in commercial quantities. In general, the amount of aldol in such mixtures ranges anywhere from 20% to 90%, but the exact concentration of aldol in the mixture will depend upon the control of the various operating conditions employed, such as the amount of catalyst fed, the rates of feed of acetaldehyde and catalyst, control of the temperatures of the respective reactors, rate of recycling and various other conditions. My process is particularly distinguished by the fact that it affords a means of producing a substantially polymer-free aldol and precludes the possibility of the adverse consequences generally resulting from undesired concentrations of catalysts and local overheating of the reaction mixture. Many other advantages of my improved process will be apparent to those skilled in the art.

I claim:

1. The method of producing aldol by condensation of acetaldehyde which comprises continuously circulating a solution of acetaldehyde in aldol through a temperature controlled reaction chamber, adding acetaldehyde and an alkaline catalyst to the circulating solution, withdrawing a portion of the circulating solution and adding an acid to the withdrawn portion to neutralize the alkaline catalyst.

2. The method of producing aldol by condensation of acetaldehyde which comprises continuously circulating a solution of acetaldehyde in aldol through a temperature controlled reaction chamber, adding acetaldehyde and an alkaline catalyst to the circulating solution, withdrawing a portion of the circulating solution, permitting continued reaction of the withdrawn portion in a temperature controlled chamber, and adding an acid to the withdrawn portion to neutralize the alkaline catalyst.

3. The method of producing aldol by condensation of acetaldehyde which comprises continuously circulating a solution of acetaldehyde in aldol through a temperature controlled reaction chamber, adding acetaldehyde and sufficient alkaline catalyst to the circulating solution to maintain a pH of 9-11, withdrawing a portion of the circulating solution and adding an acid to the withdrawn portion to neutralize the alkaline catalyst.

4. The method of producing aldol by condensation of acetaldehyde which comprises continuously circulating a solution of acetaldehyde in aldol through a temperature controlled reaction chamber, adding acetaldehyde and sufficient alkaline catalyst to the circulating solution to maintain a pH of 9-11, withdrawing a portion of the circulating solution, permitting continued reaction of the withdrawn portion in a temperature controlled chamber, and adding an acid to the withdrawn portion to neutralize the alkaline catalyst.

5. The method of producing aldol by condensation of acetaldehyde which comprises continuously circulating a solution of acetaldehyde in aldol through a temperature-controlled reaction chamber at a temperature between 20° and 40° C., adding acetaldehyde and an alkaline catalyst to the circulating solution, withdrawing a portion of the circulating solution and adding an acid to the withdrawn portion to neutralize the alkaline catalyst.

6. The method of producing aldol by condensation of acetaldehyde which comprises continuously circulating a solution of acetaldehyde in aldol through a temperature controlled reaction chamber at a temperature between 20° and 40° C., adding acetaldehyde and an alkaline catalyst to the circulating solution, withdrawing a portion of the circulating solution, permitting continued reaction of the withdrawn portion in a temperature-controlled chamber and adding an acid to the withdrawn portion to neutralize the alkaline catalyst.

7. The method of producing aldol by condensation of acetaldehyde which comprises continuously circulating a solution of acetaldehyde in aldol through a temperature-controlled reaction chamber, adding acetaldehyde and an aldol condensation catalyst to the circulating solution and withdrawing a portion of the circulating solution.

8. The method of producing aldol by condensation of acetaldehyde which comprises continuously circulating a solution of acetaldehyde in aldol through a temperature-controlled reaction chamber, adding acetaldehyde and an aldol condensation catalyst to the circulating solution, withdrawing a portion of the circulating solution and permitting continued reaction of the withdrawn portion in a temperature-controlled chamber.

9. The method of producing aldol by condensation of acetaldehyde which comprises continuously circulating a solution of acetaldehyde in aldol through a temperature-controlled reaction chamber, adding acetaldehyde and an alkaline catalyst to the circulating solution and withdrawing a portion of the circulating solution.

10. The method of producing aldol by condensation of acetaldehyde which comprises continuously circulating a solution of acetaldehyde in aldol through a temperature-controlled reaction chamber, adding acetaldehyde and an alkaline catalyst to the circulating solution, withdrawing a portion of the circulating solution and permitting continued reaction of the withdrawn portion in a temperature controlled chamber.

11. The method of producing aldol by condensation of acetaldehyde which comprises maintaining a body of a solution of acetaldehyde and an alkaline catalyst in aldol, controlling the temperature of said body of solution, substantially continuously withdrawing a portion of the solution from said body, adding an acid to a part of the withdrawn solution to neutralize the alkaline catalyst therein, adding acetaldehyde and alkaline catalyst to another part of the withdrawn portion of the solution, and returning the part of the solution to which the acetaldehyde and alkaline catalyst were added to said body of solution.

12. The method of producing aldol by condensation of acetaldehyde which comprises maintaining a body of a solution of acetaldehyde and an alkaline catalyst in aldol, controlling the temperature of said body of solution, substantially continuously withdrawing a portion of the solution from said body adjacent one end thereof, adding an acid to a part of the withdrawn solution to neutralize the alkaline catalyst therein, adding acetaldehyde and alkaline catalyst to another part of the withdrawn portion of the solution, and returning the part of the solution to which the acetaldehyde and alkaline catalyst were added to said body of solution adjacent the other end thereof.

13. The method of producing aldol by condensation of acetaldehyde which comprises maintaining a body of a solution of acetaldehyde and an alkaline catalyst in aldol, maintaining the temperature of said body between 20° C. and 40° C. substantially continuously withdrawing a portion of the solution from said body adding an acid to a part of the withdrawn solution to neutralize the alkaline catalyst therein, adding acetaldehyde and alkaline catalyst to another part of the withdrawn portion of the solution, and returning the part of the solution to which the acetaldehyde and alkaline catalyst were added to said body of solution.

14. The method of producing aldol by condensation of acetaldehyde which comprises maintaining a body of a solution of acetaldehyde and an alkaline catalyst in aldol, controlling the temperature of said body of solution, substantially continuously withdrawing a portion of the solution from said body, adding an acid to a part of the withdrawn solution to neutralize the alkaline catalyst therein, cooling another part of the withdrawn portion of the solution, adding acetaldehyde and alkaline catalyst to the cooled part of the withdrawn portion of the solution, and returning the part of the solution which was cooled and to which the acetaldehyde and alkaline catalyst were added to said body of solution.

15. The method of producing aldol by condensation of acetaldehyde which comprises maintaining a body of a solution of acetaldehyde and an alkaline catalyst in aldol, controlling the temperature of said body of solution, substantially continuously withdrawing a portion of the solution from said body, maintaining a part of the withdrawn solution under conditions such that condensation of the acetaldehyde therein continues for a further period of time, thereafter adding an acid to said part of the withdrawn portion of the solution to neutralize the alkaline catalyst therein, adding acetaldehyde and alkaline catalyst to another part of the withdrawn portion of the solution, and returning the part of the solution to which the acetaldehyde and alkaline catalyst were added to said body of solution.

16. The method of producing aldol by condensation of acetaldehyde which comprises maintaining a body of a solution of acetaldehyde and an alkaline catalyst in aldol, controlling the temperature of said body of solution, substantially continuously withdrawing a portion of the solution from said body, adding an acid to a part of the withdrawn solution to neutralize the alkaline catalyst therein, adding acetaldehyde and alkaline catalyst to another part of the withdrawn portion of the solution, and returning the part of the solution to which the acetaldehyde and alkaline catalyst were added to said body of solution, the amount of alkaline catalyst added to the returned part of the withdrawn solution being sufficient to maintain a pH of from about 9 to 11 in said body of solution.

17. The method of producing aldol by condensation of acetaldehyde which comprises maintaining a body of a solution of acetaldehyde and an alkaline catalyst in aldol, maintaining the temperature of said body between 20° C. and 40° C., substantially continuously withdrawing a portion of the solution from said body, maintaining a part of the withdrawn solution under conditions such that condensation of the acetaldehyde therein continues for a further period of time, thereafter adding an acid to said part of the withdrawn portion of the solution to neutralize the alkaline catalyst therein, cooling another part of the withdrawn portion of the solution, adding acetaldehyde and alkaline catalyst to said cooled part of the withdrawn portion of the solution, and returning the part of the solution which was cooled and to which the acetaldehyde and alkaline catalyst were added to said body of solution, the alkaline catalyst being added to the cooled part of the solution in an amount sufficient to maintain a pH of from about 9 to 11 in said body of solution.

DAVID C. HULL.

REFERENCES CITED

The following references are of record in the file of this patent:

UNITED STATES PATENTS

| Number | Name | Date |
|---|---|---|
| 1,234,156 | Gunstein | July 24, 1917 |
| 1,450,984 | Matheson | Apr. 10, 1923 |
| 1,598,522 | Herrly | Aug. 31, 1926 |
| 1,881,853 | Mueller-Cunradi et al. | Oct. 11, 1932 |
| 2,286,037 | Loder | June 9, 1942 |
| 2,318,341 | Thompson | May 4, 1943 |

Certificate of Correction

Patent No. 2,428,846.  October 14, 1947.

DAVID C. HULL

It is hereby certified that the above numbered patent was erroneously issued to the inventor, "David C. Hull, assignor of one-half interest to Air Reduction Company, Incorporated," whereas said patent should have been issued to *David C. Hull, assignor, by direct and mesne assignments, of one-half to Eastman Kodak Company, Rochester, N. Y., a corporation of New Jersey, and one-half to Air Reduction Company, Incorporated, New York, N. Y., a corporation of New York*, as shown by the record of assignments in this Office, and that the said Letters Patent should be read with this correction therein that the same may conform to the record of the case in the Patent Office.

Signed and sealed this 10th day of February, A. D. 1948.

[SEAL]

THOMAS F. MURPHY,
*Assistant Commissioner of Patents.*